United States Patent
Deng et al.

(10) Patent No.: US 11,948,111 B1
(45) Date of Patent: Apr. 2, 2024

(54) DEEP LEARNING-BASED DEMAND FORECASTING SYSTEM

(71) Applicant: AMERICAN AIRLINES, INC., Fort Worth, TX (US)

(72) Inventors: Na Deng, Keller, TX (US); Benjamin Segal, Dallas, TX (US); Ou Bai, Euless, TX (US); Adam Thayer, Arlington, TX (US); Venkata Pilla, Southlake, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 143 days.

(21) Appl. No.: 17/509,812

(22) Filed: Oct. 25, 2021

Related U.S. Application Data

(60) Provisional application No. 63/107,143, filed on Oct. 29, 2020.

(51) Int. Cl.
  *G06Q 10/00* (2023.01)
  *G06N 3/045* (2023.01)
  *G06Q 10/04* (2023.01)
  *G06Q 10/0631* (2023.01)
  *G06Q 30/0201* (2023.01)

(52) U.S. Cl.
  CPC ....... *G06Q 10/06315* (2013.01); *G06N 3/045* (2023.01); *G06Q 10/04* (2013.01); *G06Q 30/0206* (2013.01)

(58) Field of Classification Search
  None
  See application file for complete search history.

(56) References Cited

U.S. PATENT DOCUMENTS

| | | | |
|---|---|---|---|
| 7,899,699 B1 * | 3/2011 | Kumar | G06Q 50/14 |
| | | | 705/7.31 |
| 9,727,940 B2 * | 8/2017 | Tracy | G06Q 50/30 |
| | (Continued) | | |

OTHER PUBLICATIONS

Q He et al. (Inferring High-Resolution Individual's Activity and Trip Purposes with the Fusion of Social Media, Land Use and Connected Vehicle Trajectories)—2017 rosap.ntl.bts.gov (hereinafter He). (Year: 2017).*

(Continued)

*Primary Examiner* — Hafiz A Kassim
(74) *Attorney, Agent, or Firm* — HAYNES AND BOONE, LLP

(57) ABSTRACT

A method of training a neural network to approximate a forecasting error of a passenger-demand forecasting model that includes calculating, using the forecasting model, a historical passenger demand forecast for each key level in a set of key levels and for each departure date in a set of historical departures dates; applying a dropout model to the historical passenger demand forecasts to create a training sample; training, using the historical passenger demand forecasts and the training sample, the neural network, to approximate forecasting errors associated with the forecasting model; calculating, using the forecasting model, a future passenger demand forecast for each key level in the set of key levels and for each departure date in a set of future dates; and approximating, using the trained neural network, the forecasting error associated with the future passenger demand forecasts for the second set of departure dates.

20 Claims, 10 Drawing Sheets

(56) References Cited

U.S. PATENT DOCUMENTS

| | | | | |
|---|---|---|---|---|
| 10,395,197 | B1* | 8/2019 | Salam | G06Q 10/06314 |
| 2003/0115093 | A1* | 6/2003 | Lim | G06Q 10/02 |
| | | | | 705/5 |
| 2012/0089476 | A1* | 4/2012 | Walker | G06Q 20/085 |
| | | | | 705/26.4 |
| 2018/0121847 | A1* | 5/2018 | Zhao | G06Q 10/06315 |
| 2018/0341876 | A1* | 11/2018 | Ghosh | G05B 23/0221 |
| 2019/0272752 | A1* | 9/2019 | Alesiani | G08G 1/0129 |

OTHER PUBLICATIONS

X Ning (Effective information seeking from multi-source data) 2019—unsworks.unsw.edu.au. (Year: 2019).*

J Ke, H Zheng, H Yang, X Chen et al. (Short-Term Forecasting of Passenger Demand under On-Demand Ride Services: A Spatio-Temporal Deep Learning Approach) Elsevier Jun. 21, 2017. (Year: 2017).*

Y Gal, Z Ghahramani (Dropout as a Bayesian approximation: Representing model uncertainty in deep learning) international conference on machine . . . , 2016—proceedings.mlr.press. (Year: 2016).*

Duc-Thinh, Pham (Machine Learning -based Flight Trajectories Prediction and Air Traffic Conflict Resolution Advisory) Doctor of Philosophy—dissertation, Jun. 2019. (Year: 2019).*

N Srivastava, G Hinton, A Krizhevsky . . . (Dropout: a simple way to prevent neural networks from overfitting) The journal of machine . . . , 2014—jmlr.org. (Year: 2014).*

Convolutional Neural Network Wiki page; https://en.wikipedia.org/wiki/Convolutional_neural_network; accessed on Oct. 19, 2020.

Francois Chollet, Deep Learning with Python, Manning Publications, 2017.

Ke, J., Zheng, H., Yang, H., Chen, X. (Michael), 2017. Short-term forecasting of passenger demand under on-demand ride services: A spatio-temporal deep learning approach. Transp. Res. Part C Emerg. Technol. 85, 591-608. https://doi.org/10.1016/j.trc.2017.10.016.

Long Short-Term Memory Wiki page; https://en.wikipedia.org/wiki/Long_short-term_memory; accessed on Oct. 19, 2020.

Yarin Gal and Zoubin Ghahramani. Dropout as a Bayesian approximation: Representing model uncertainty in deep learning. arXiv:1506.02142, 2015c.

"Engineering Uncertainty Estimation in Neural Networks for Time Series Prediction at Uber". http://eng.uber.com/neural-networks-uncertainty-estimation; accessed Sep. 6, 2017.

* cited by examiner

DEEP LEARNING-BASED DEMAND FORECASTING SYSTEM

CROSS-REFERENCE TO RELATED APPLICATION

This application claims the benefit of the filing date of, and priority to, U.S. Application No. 63/107,143, filed Oct. 29, 2020, the entire disclosure of which is hereby incorporated herein by reference.

TECHNICAL FIELD

This disclosure relates in general a deep learning-based demand forecasting system, specifically a deep learning-based demand forecasting system that has an error prediction model.

BACKGROUND

Revenue Management (RM) strategies are extensively used in industries which sell perishable or time-dependent products (e.g., hotel rooms, airline seats, etc.) and have longer booking horizons like airlines, hotels, cruise lines, theaters, car rental agencies, etc. Accurate forecasting in RM helps predict passenger or customer demand to optimize inventory and price availability in an effort to maximize revenue. There are, however, multiple problems with conventional demand forecasting models.

First, true fare demand is never observed using conventional demand forecasting models. In an effort to capture/predict all expected demand, conventional demand forecasting models "unconstrain" bookings. The systems and methods used by conventional demand forecasting models generally unconstrain booking data, and then that unconstrained booking data is used for inputs into other, downstream modules. As such, any errors associated with the unconstrained booking data are propagated to downstream modules. As such, using conventional technology, model bias and uncertainty from an "upstream" module, such as the unconstrain module, will be propagated to downstream modules, which affects the entire forecast accuracy.

Second, passenger demand is highly impacted by seasonality, such as different days of week, different months, different holidays, and various special events. Seasonality cannot be strictly tied to a date (e.g., the days of the week and some holidays fall of different dates for different years). Similar to the problem relating to unconstraining the historical data, conventional demand forecasting models attempt to de-seasonalize the historical data, which is then used for inputs into other, downstream modules. As such, any errors associated with the de-seasonalized booking data are propagated to downstream modules. As such, using conventional technology, model bias and uncertainty from an "upstream" module, such as the de-seasonalize module, will be propagated to downstream modules, which affects the entire forecast accuracy.

Third, demand for future flights is dependent on historical data and its trend. Thus, the temporal relationship of historical data needs to be accounted for when determining demand for future flights. Using conventional demand forecasting models, trying to capture the temporal relationship of historical data is a very computational expensive process that requires a large amount of memory. For example, in an attempt to capture the temporal relationship of historical data, some conventional demand forecasting models store over 1 million "keys," which each key representing a time series for a unique and different combination of flight, date, and demand details.

Fourth, with reduced fare restrictions, passengers can be sold up and down easily. Hence, demand for one fare product is not only determined by its own fare and its availability, but also dependent on all other fare products' prices and their availabilities. The sell-up/buy down dependencies across fare products need to be considered when forecasting demand. Conventional demand forecasting models cannot capture these spatial booking relationships.

DETAILED DESCRIPTION

Figure 1:
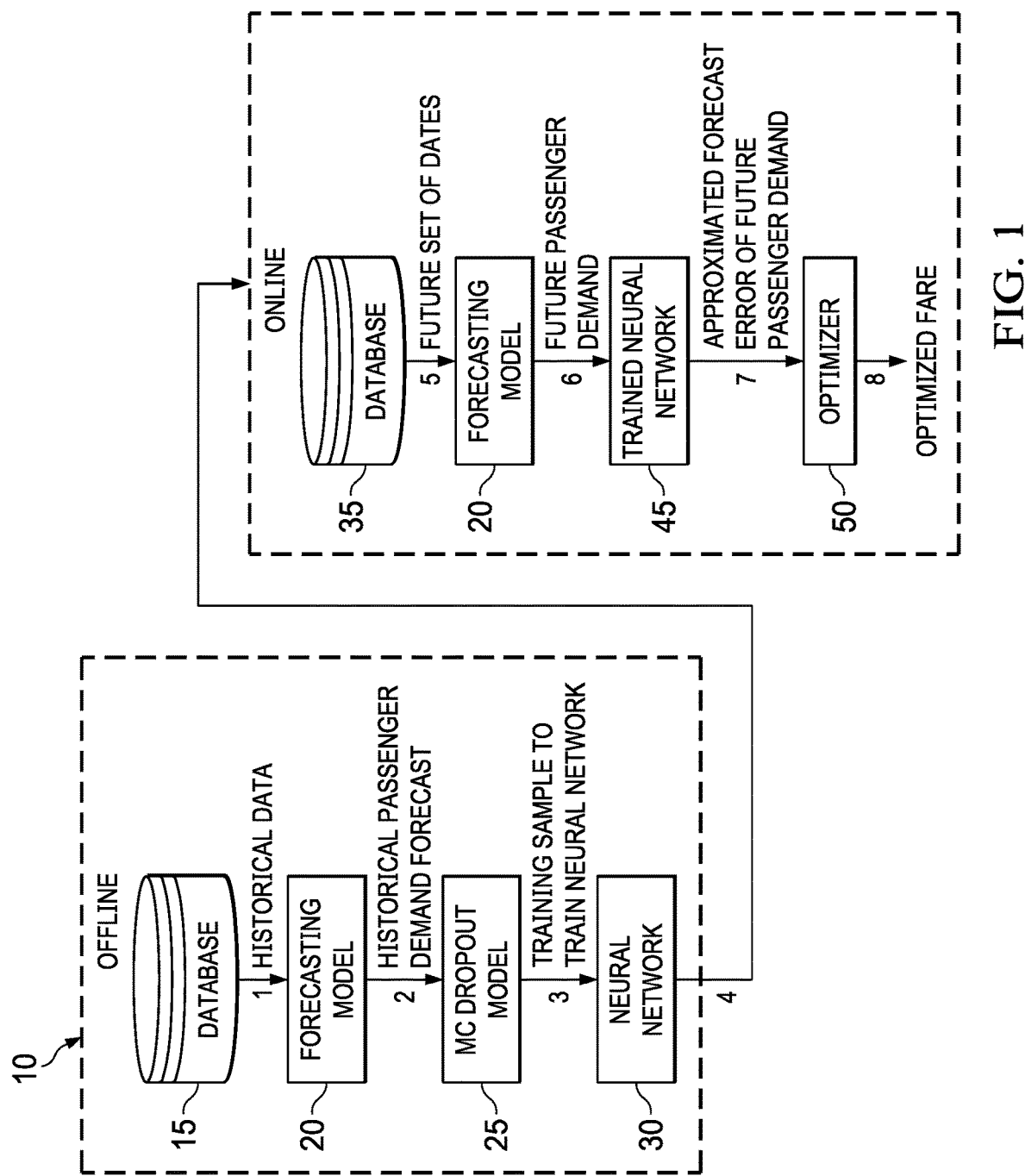
FIG. 1 is a data flow diagram associated with a deep learning-based demand forecasting system, according to an example embodiment.

The deep learning-based demand forecasting system described herein provides a new forecasting model, which can be used in any RM demand system. The described forecasting model uses airline demand forecasting as an example. FIG. 1 illustrates a data flow diagram that is associated with one embodiment of a deep learning-based demand forecasting system that is referenced by the numeral 10. As illustrated in FIG. 1, the system 10 includes a database 15 in which historical data is stored, a forecasting model 20 that uses the historical data to create a historical passenger demand forecast, and a MC Dropout Model 25 that uses the historical passenger demand forecast to create a training sample to train a neural network 30. The system 10 also includes a database 35 in which a future set of dates and data is stored, with the forecasting model 20 using the future set of dates and data to create a future passenger demand. The trained neural network 45 approximates the forecast error of the future passenger demand that was created by the forecasting model 20. The system 10 also includes an optimizer 50 that uses the future passenger demand and the approximated forecasting error of the future passenger demand to optimize inventory and price availability of each key level. The databases 15 and 35 may be separate database or the same database. As shown in FIG. 1, the creation of the historical passenger demand forecast and the training of the neural network 30 is performed "offline" whereas the creation of the future passenger demand and the calculation of the approximated forecast error of the future passenger demand is performed "online" or in real time.

Figure 2:
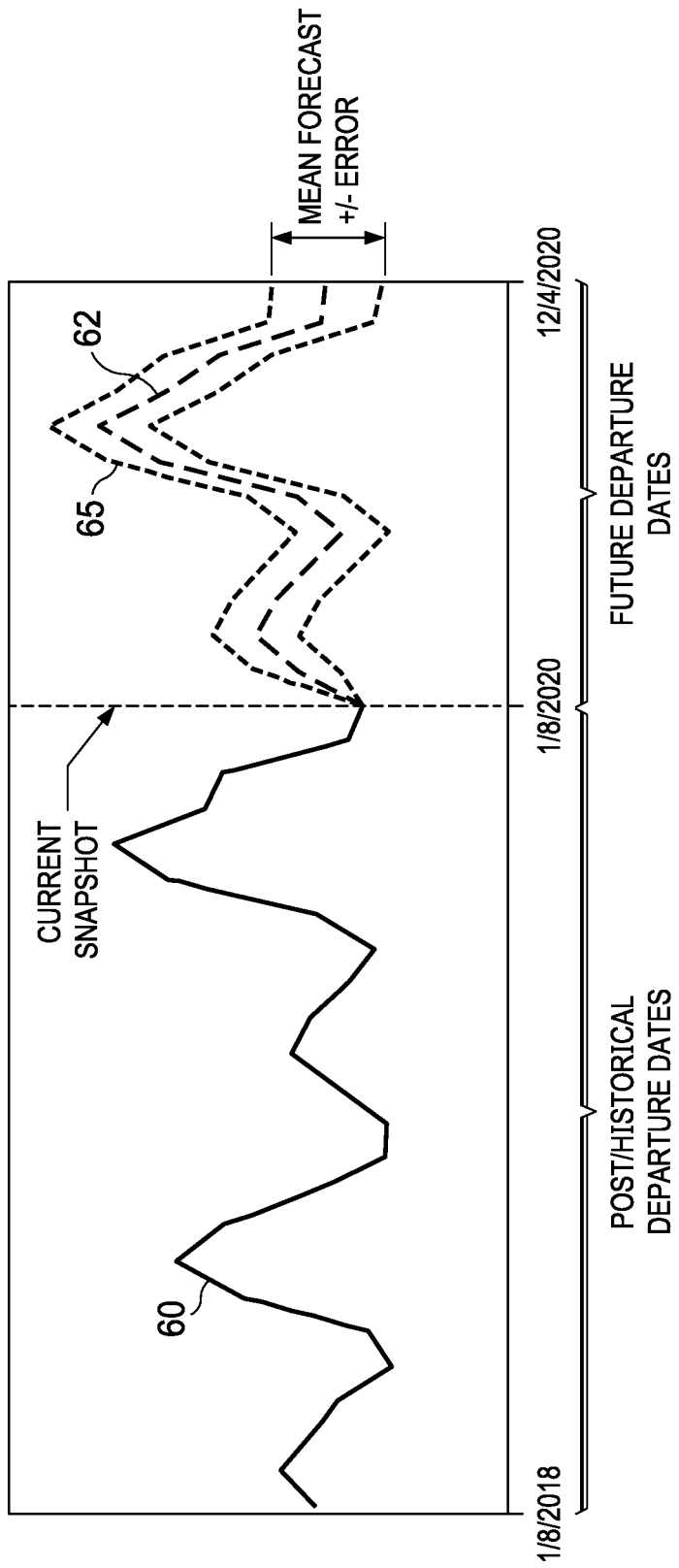
FIG. 2 is a graphical representation of historical passenger demand and forecasted passenger demand generated using the system of FIG. 1, according to an example embodiment.

In airline RM, a forecast is produced for all future flights to set a baseline expectation of passenger demand for different fare products at different arrival/departure times. In some embodiments, a fare product is a marketable combination of access rights associated with a charging moment. In some embodiments, the charging moment is the moment relative to actual travel at which the journey is actually charged to the customer. FIG. 2 is a graphical representation that includes a line chart 55 including a line 60 that is a graphical representation of historical passenger demand, a line 62 that is a graphical representation of forecasted passenger demand for future departure dates, and a +/− error margin 65 associated with the forecasted passenger demand. As illustrated, the lines 60 and 62 are specific to a "key level" that is defined by a Market, holiday indication, departure time, local vs. flow indication, day of the week, fare band, and a forecast period. In this example, the market is from DFW to PHL, there is no holiday indication, the departure time is 6:00 AM, there is a local indication, the day of the week is Friday, the fare band is indicated, and the forecast period is 150 days to 331 days before departure. As such, the lines 60 and 62 represent demand, from 150 days to 331 days before departure and at a price indicated by the fare band, of a non-holiday Friday flight from DFW to PHL that leaves at 6 am for local traffic (i.e., traffic with original departure location of DFW and final destination of PHL instead of traffic with an original departure location other than DFW or final destination other than PHL). The system 10, specifically the forecasting model 20, uses the historical demand (indicated by the line 60) to predict the forecasted passenger demand (indicated by the line 62) and then the trained neural network 45 generates the approximated forecast error (indicated by the numeral 65) associated with that forecasted passenger demand.

The accuracy of the forecasted passenger demand is very crucial for successful airline RM. However, demand forecasting is challenging for at least four reasons. First, true demand is never observed. Only bookings are observed, but these are always constrained by capacity and availability. Second, demand for future flights is dependent on historical data and its trend. Thus, the temporal relationship of historical data needs to be accounted for when determining demand for future flights. Third, passenger demand is highly impacted by seasonality, such as different days of week, different months, different holidays, and various special events. Seasonality cannot be strictly tied to a date (e.g., the days of the week and some holidays fall of different dates for different years). Fourth, with reduced fare restrictions, passengers can be sold up and down easily. Hence, demand for one fare product is not only determined by its own fare and its availability, but also dependent on all other fare products' prices and their availabilities. The sell-up/buy down dependencies across fare products need to be addressed.

Figure 3:
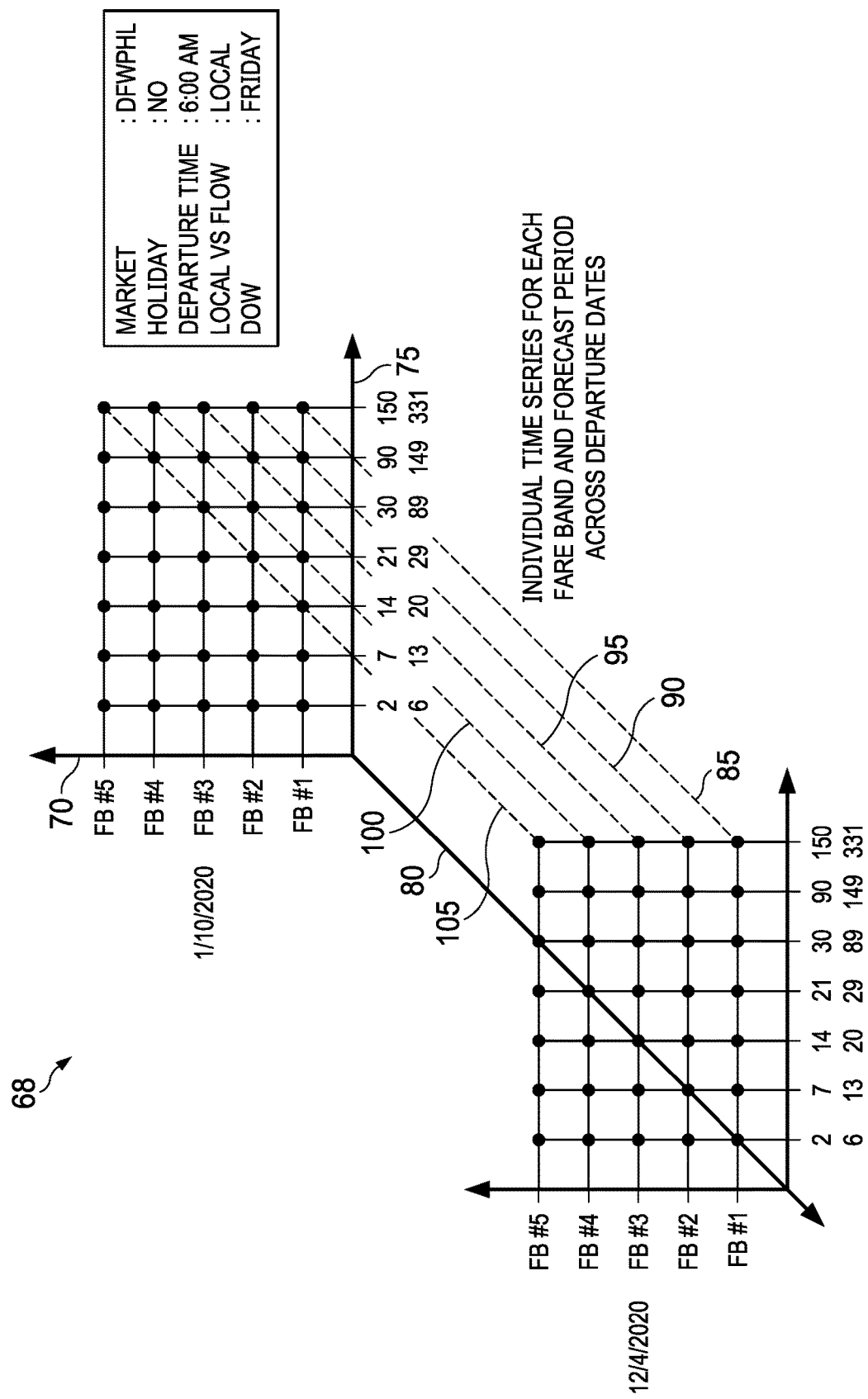
FIG. 3 is a graphical representation depicting the calculation of a forecasted passenger demand using prior art.

While conventional technology cannot solve all of the problems noted above, its attempt requires an extensive amount of memory to store over 1 million "keys" that represent unique and different combinations of flight, date, and demand details (e.g., key levels). The creation, storage, and processing of the extremely large number of keys requires a large amount of memory and processing power of a computing system. As such, the conventional technology in the technical field of demand forecasting is very computationally expensive and does not solve all of the problems noted above. FIG. 3 is a graphical representation referenced by the numeral 68 that depicts five "keys" used in conventional technology. The representation 68 includes a three-axis graph. The first axis 70 or the "y" axis depicts the different fare bands. In this example there are five fare bands, but any number of fare bands may be used. The second axis 75 or "x" axis depicts the different forecast periods. The third axis 80 depicts dates, with two dates represented by x-y graphs in the graphical representation 68: Jan. 10, 2020 and Dec. 4, 2020. The graphical representation 68 includes lines 85, 90, 95, 100, and 105 that depict the demand, as a time series, for fare bands FB #1, FB #2, FB #3, FB #4, and FB #5, respectively, during the forecast period of 150 days to 331 days before departure of a non-holiday Friday flight from DFW to PHL for leaving at 6 am for local traffic. The lines 90, 95, 100, and 105 extend from the x-y graph associated with Jan. 10, 2020 to the x-y graph associated with Dec. 4, 2020 to represent an individual time series for that fare band and that forecast period across, and including, the departure dates of Jan. 10, 2020 to Dec. 4, 2020. The five lines 85, 90, 95, 100, and 105 represent five "keys" that are used in conventional technology to determine future demand for those "keys," which is the specific combination of flight, date, and fare details. The five lines 85, 95, 100, and 105 are shown for explanatory purposes only, and to calculate future demand using conventional technology, approximately 1.15 million "keys" are required. As such, the electronic memory requirements and processing power to create, store, and process these keys is significant to the computer within which these keys are stored and processed. Moreover, and as illustrated by the graphical representation 68, there is no spatial relationship depicted or captured between the fare bands FB #1, FB #2, FB #3, FB #4, and FB #5 in the forecast period 150-331. As such, the conventional technology does not address the problem that demand for one fare product is not only determined by its own fare and its availability.

Figure 4:
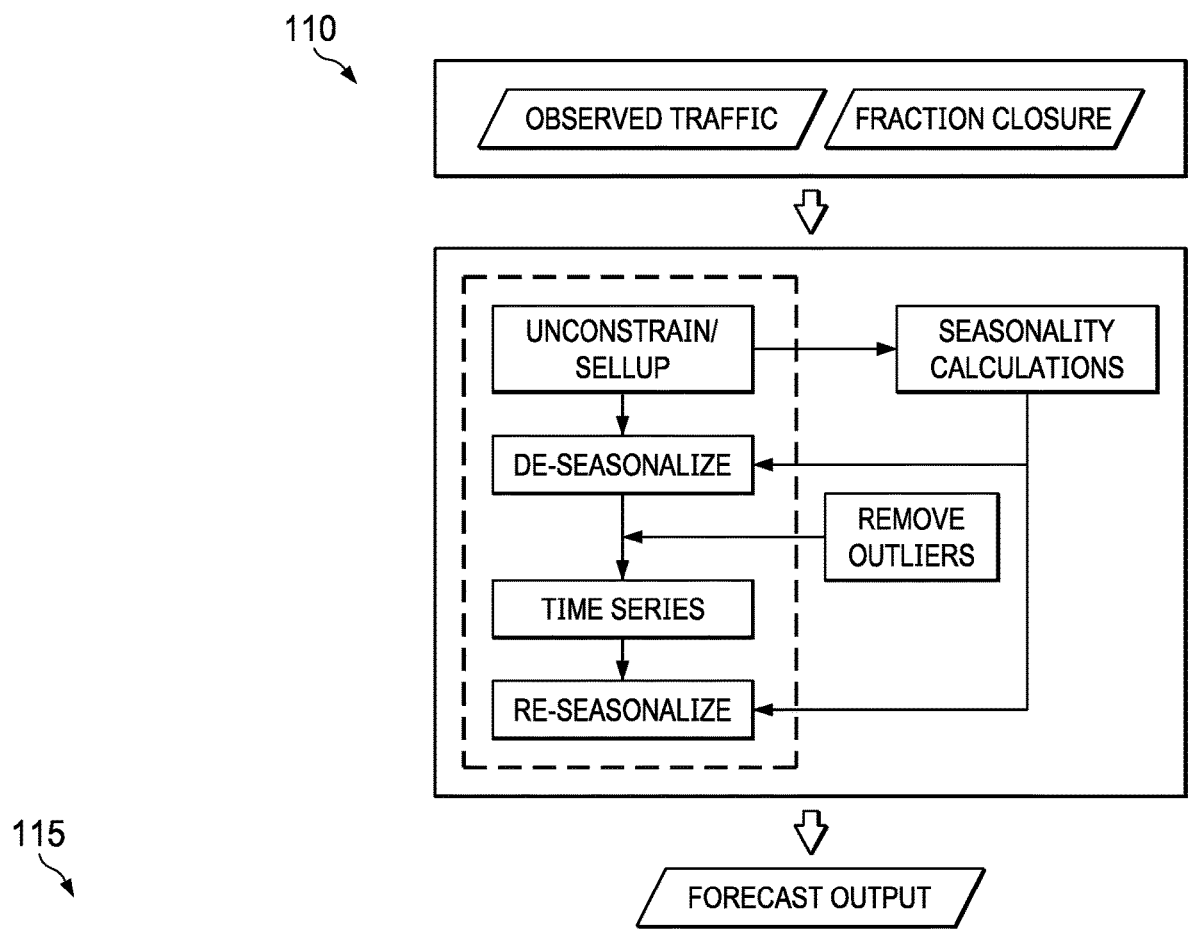
FIG. 4 is a flow chart illustration depicting the calculation of a forecasted passenger demand using prior art.

In addition to the problems noted above with conventional technology in the field of revenue management, conventional technology includes a framework that requires de-seasonalizing before a time series is modeled and then re-seasonalizing after the time series is modeled. That is, conventional forecasting systems have three different major modules to predict passenger demand, which are seasonality, demand unconstraining, and time-series models. FIG. 4 is a figure of a flow chart referenced by the numeral 110 that is associated with the prior art and that depicts the outputs from one module working as inputs to the next module. For example, the outputs from the unconstrain/sellup module are inputs to the de-seasonalize module, and the outputs from the de-seasonalize module are inputs to the time series module, etc. As such, using conventional technology, model bias and uncertainty from an "upstream" module, such as the unconstrain/sellup module, will be propagated to downstream modules, which affects the entire forecast accuracy. Generally, when looking back on historical data, it is known how many people bought a seat, but it is harder to know how many people wanted to buy a seat but could not. Unconstraining bookings/demand attempts to produce a forecast that represents all expected demand, not just demand that materialized into a booking. Unconstraining bookings attempts to remove limits, such as capacity, schedule changes, filed fares, to understand the complete picture of all people who likely would have wanted to purchase a seat on a flight. Unconstraining bookings recognizes that some passengers may have been spilled due to class closure (e.g., that a passenger bought a different class because the class they originally wanted was already closed), corrects for those spilled bookings, and estimates total demand by leveraging bookings and class closure information. As noted, with conventional demand forecasting models, any errors associated with the unconstraining process are propagated to downstream modules. Finally, the model/system associated with the flow chart 110 is hard to extend to incorporate other useful information, such as pricing and capacity information.

The system 10 uses a deep learning-based approach to solve the complex problems relating to airline RM that are noted above. The deep-learning based approach uses the forecasting model 20, which is an integrated model that combines a convolutional neural network ("CNN") model, a Long Short-Term Memory model ("LSTM"), and demand seasonality together. The CNN model is used to capture the booking relationship between different fare products, and the LSTM model is used to model the time series or temporal problem. Both effects are modeled simultaneously by a convolutional LSTM. Seasonality in the data, such as different days of the week, different weeks of the year, and holidays/non-holidays, are also taken into account as features in the forecasting model 20. Therefore, the forecasting model 20 can coordinate all the parts together in one end-to-end deep learning structure to do airline passenger demand forecasting.

In addition, the described system 10 includes a new framework to estimate model uncertainty more efficiently and accurately than previous methods. Measuring prediction uncertainty is important to the system 10 because the prediction error of the forecasting model 20 is a key input in a downstream RM optimization model (e.g., the optimizer 50). Generally, MC dropout models run slowly when a large number of iterations are needed to get accurate error predictions. For that reason, it is very challenging to apply this method to solve large scale forecast problems where prediction errors need to be provided in near real time (e.g., overnight or within a few days). With the system 10, the trained neural network model 45 is built/trained to approximate the prediction error of the forecasting model 20. Generally, with the system 10, the MC dropout mode/method 25 is only called once or quarterly to generate samples for it to train the NN model 30. The trained NN model 45 can then be used directly to provide the forecast errors, which significantly reduces the time required to measure the prediction uncertainty for large scale demand forecast problems.

Figure 5:
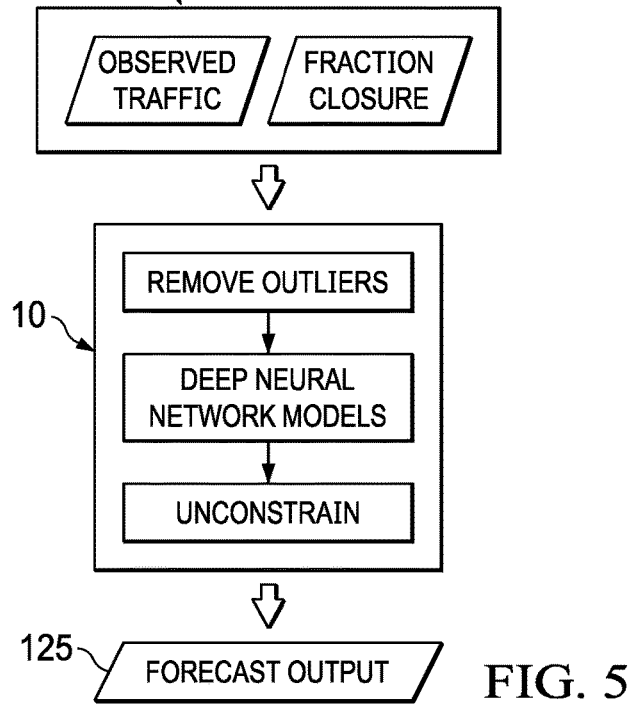
FIG. 5 is a flow chart illustration depicting the calculation of a forecasted passenger demand using the system of FIG. 1, according to an example embodiment.

FIG. 5 is a figure of a flow chart referenced by the numeral 115 that is associated with the system 10. As illustrated, the system 10 receives the inputs 120, which are illustrated as observed traffic and fraction closure, and produces a forecast output 125. The observed traffic generally includes historical bookings for historical flights. As such, the observed traffic includes historical data that may include booking information for a historical set of dates, seasonality factors associated with the historical set of dates, fares and rules associated with the booking information, etc. Generally, the booking information includes a date on which the booking was made, fare paid on the booking date, and flight information for the booking, which may include a class and a directional market. For example, if the booking was of a flight from DFW to SFO, then the DFW to SFO is the directional market. In some embodiments, the direction market indicates a departure location from which a passenger departs and an arrival location at which the passenger arrives. In some embodiments, the class category reflects a fare paid by the passenger. The historical data may also include, for each booking, the day of the week on which the passenger departs from the departure location and a block of time during the day in which the passenger departs from the departure location. The booking information may also include a forecast period, or the forecast period can be derived from the booking information. Generally, a forecast period is associated with the period of time before departure during which the booking was made and/or the fare was paid. For example, if the booking was made six months before the departure of the booked flight, then the forecast period associated with that booking would indicate that the booking was made six months before the departure of the booked flight or fell within a time period that included a booking being made six months before the departure of the booked flight. Regarding the seasonality factors, seasonality factors indicate that a flight on a specific date in a specific year fell on a specific day of the week, holiday, non-holiday, or other special event. Fraction closure includes class closures. Classes include local value classes and flow value classes. In some embodiments, there are ten class categories with a 1 class being associated with a high value and a 10 class being associated with a low value. In some embodiments, the lower value classes are associated with more restrictive rules than rules associated with higher value classes. In some embodiments, local value classes are value classes associated with traffic between an original departure location and final destination, whereas flow value classes are associated with traffic having a different departure location than the departure location associated with the direction/directional market and/or a different final destination than the destination associated with the direction/directional market. In some embodiments, each flight has a number of seats associated with each class. Generally, class closure is when there are no more seats available for a class. In some embodiments, fraction closure data includes information relating to the timing of the class closures relative to the forecast period.

As illustrated in FIG. 5, the system 10 removes outliers from the inputs 120. Examples of outliers include significantly increased demand due to a conference, significantly increased demand due to the sporting event, etc. After removing outliers, the system 10 uses deep neural network models (e.g., the CNN model and the LSTM model) and unconstrains the demand to calculate max pay demand, which is fed to the optimizer 50. The output is the forecast output 125. Max pay demand is the maximum amount a passenger is willing to pay for a product. In some embodiments, the max pay demand is associated with how much of the demand for a lower level would actually be willing to buy at a higher level. In some embodiments, Max Pay UNC is the demand type applied to future flights. In one embodiment, the system 10 unconstrains the demand towards the end of the forecasting process to avoid propagating errors throughout the forecasting process.

Figure 6:
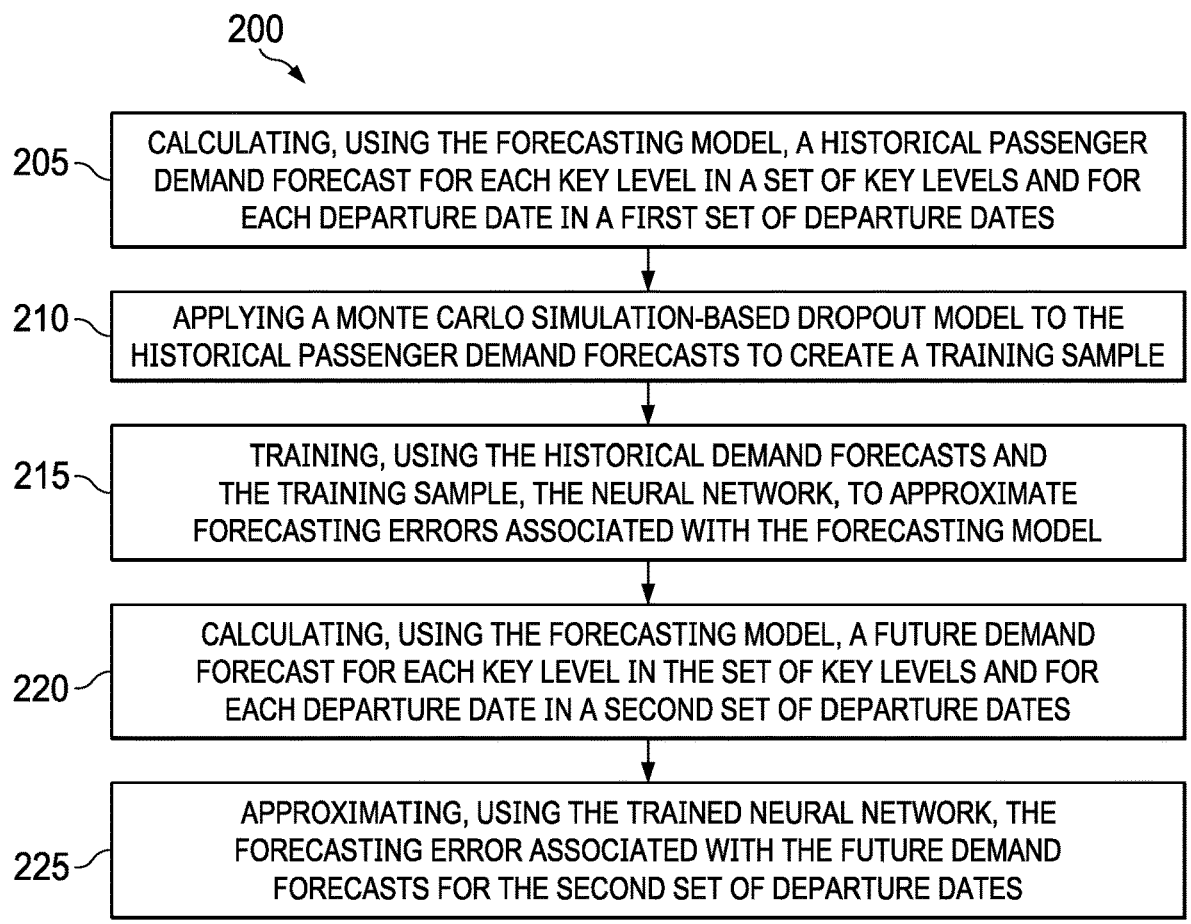
FIG. 6 is another flow chart illustration depicting the calculation of a forecasted passenger demand using the system of FIG. 1, according to an example embodiment.

In an example embodiment, as illustrated in FIG. 6 with continuing reference to FIGS. 1, 2, and 5, a method 200 of operating the system 10 includes calculating, using the forecasting model 20, a historical passenger demand forecast for each key level in a set of key levels and for each departure date in a first set of departure dates at a step 205; applying a Monte Carlo simulation-based dropout model to the historical passenger demand forecasts to create a training sample at a step 210; training, using the historical demand forecasts and the training sample, the neural network 30, to approximate forecasting errors associated with the forecasting model 20 at step 215; calculating, using the forecasting model 20, a future demand forecast for each key level in the set of key levels and for each departure date in a second set of departure dates at step 220; and approximating, using the trained neural network 45, the forecasting error associated with the future demand forecasts for the second set of departure dates at step 225.

Figure 7:
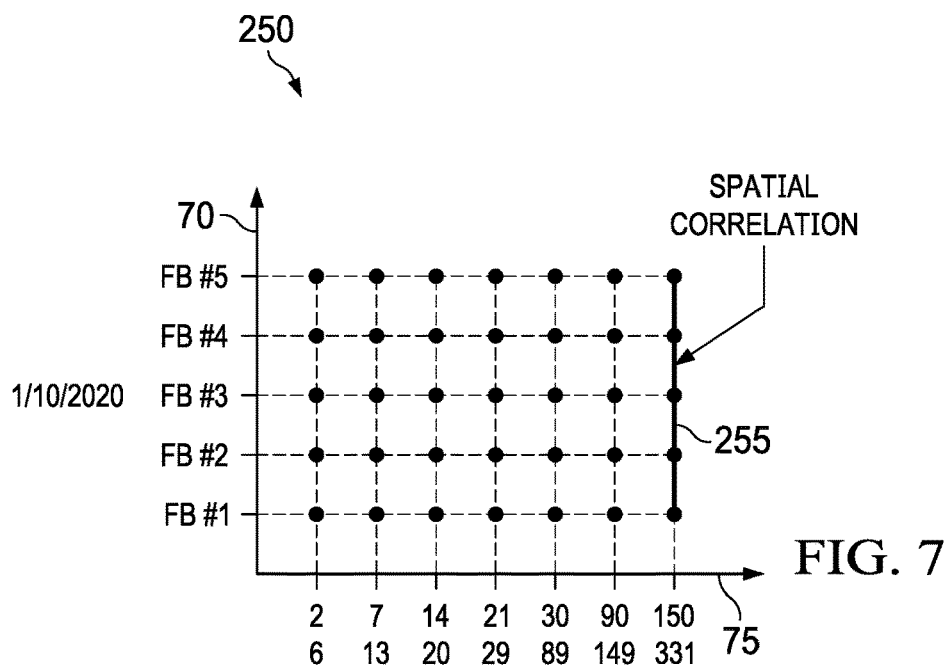
FIG. 7 is graphical representation depicting a spatial correlation identified using the system of FIG. 1, according to an example embodiment.

In some embodiments and at the step 205, the system 10 calculates, using the forecasting model 20, a historical passenger demand forecast for each key level in a set of key levels and for each departure date in a first set of departure dates. Initially, the CNN model of the forecasting model 20 is used to capture the booking relationship between different fare products. FIG. 7 illustrates a graphical representation referenced by the numeral 250 that includes an x-y graph for the date of Jan. 10, 2020, similar to the x-y graph for the date of Jan. 10, 2020 and key level illustrated in the graphical representation 68 associated with the prior art. The x-y graph representation of FIG. 7, however, includes a line 255 associated with the fare band 150-331 that extends from the lowest fare band to the highest fare band. The line 255 depicts the spatial correlation between fare bands. The CNN model of the forecasting model 20 is used to capture this spatial correlation. In some embodiments, the CNN model is a type of deep learning model. In some embodiments, the CNN model includes an input and an output layer, as well as multiple hidden layers. The hidden layers include a series of convolutional layers that convolve with a multiplication or other dot product. A Rectified Linear Unit ("RELU") function is commonly used in the activation function. It usually includes pooling layers and dense layers as well.

Figure 8:
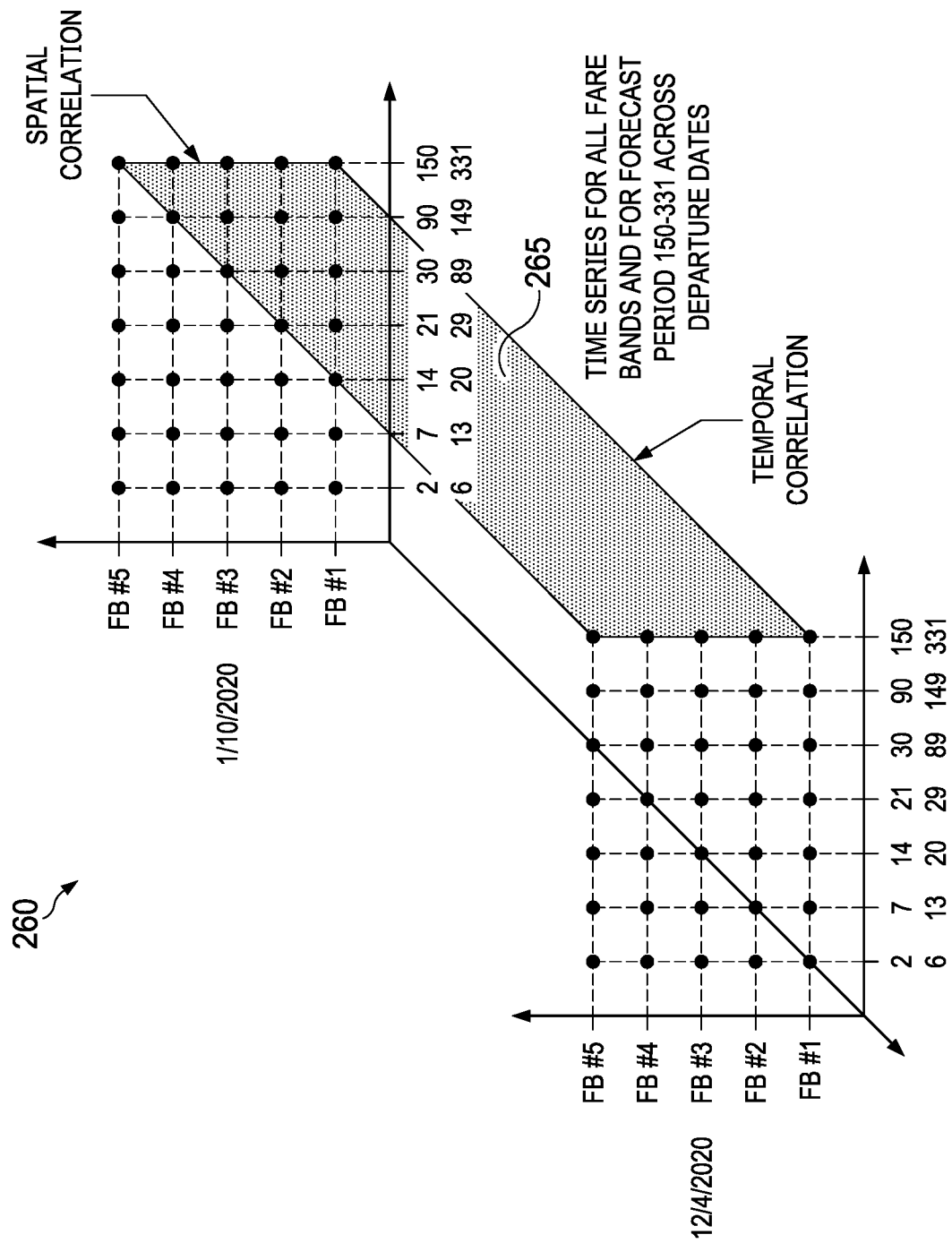
FIG. 8 is a graphical representation depicting, using the system of FIG. 1, a temporal correlation that includes the spatial correlation of FIG. 7, according to an example embodiment.
Figure 9:
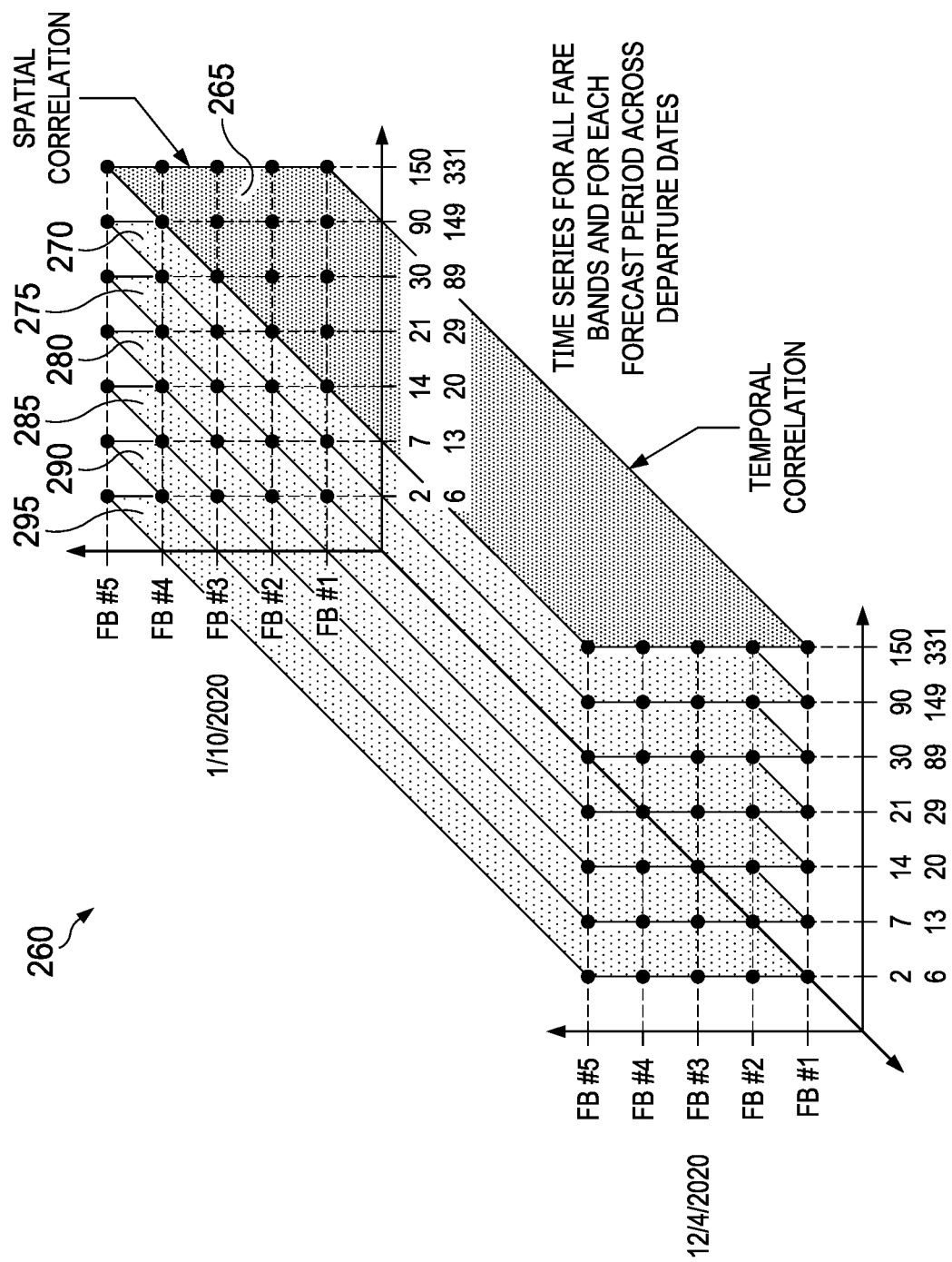
FIG. 9 is a graphical representation depicting, using the system of FIG. 1, multiple temporal correlations that includes the temporal correlation of FIG. 8, according to an example embodiment.

The LSTM model of the forecasting model 20 is used to model the time series for each key level. FIG. 8 is a graphical representation referenced by the numeral 260 that is similar to the representation 68 in that it includes the three-axis graph depicted in representation 68 for the same key level. FIG. 8, however, illustrates a plane 265 that includes the line 255 of FIG. 7 and that represents the time series for all fare bands and for the forecast period 150-331 across departure dates. FIG. 9 is similar to the graphical representation 260 except that FIG. 9 illustrates the plane 265 as well as planes 270, 275, 280, 285, 290, and 295 that represent the times series for all fare bands and for seven forecast periods, respectively. In some embodiments, the LSTM model is a recurrent neural network. In some embodiments, the LSTM model includes three gates: the input gate indicates the new information to store in the cell state; the forget gate indicates the information to be thrown away from the cell state; and the output gate that provides the activation to the output of the LSTM block at timestamp t. In some embodiments, the LSTM model is represented by the following mathematical representations and equations:

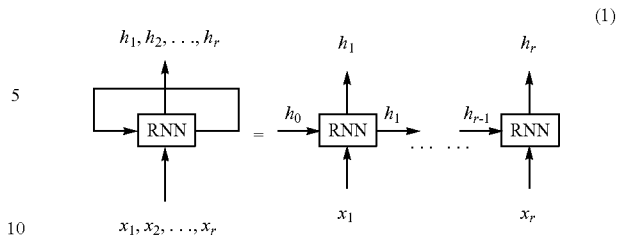

(1)

With:

$$i_t = \sigma(W_{xi}x_t + W_{hi}h_{t-1} + W_{ci} \circ c_{t-1} + b_i) \quad (2)$$

$$f_t = \sigma(W_{xf}x_t + W_{hf}h_{t-1} + W_{cf} \circ c_{t-1} + b_f) \quad (3)$$

$$c_t = f_t \circ c_{t-1} + i_t \circ \tanh(W_{xc}x_t + W_{hc} \circ c_{t-1} + b_c) \quad (4)$$

$$o_t = \sigma(W_{xo}x_t + W_{ho}h_{t-1} + W_{co} \circ c_t + b_o) \quad (5)$$

$$h_t = o_t \circ \tan hc_t \quad (6)$$

Where:
$i_t$: input gate at time stamp t;
$f_t$: forget gate at time stamp t;
$c_t$: memory cell state vector at time stamp t;
$o_t$: output gate at time stamp t;
$h_t$: hidden state also known as output vector at time stamp t;
W: the weighted parameter matrices which need to be learned during training; and
b: bias vector parameters which need to be learned during training.

In some embodiments, the ConvLSTM (convolutional LSTM) model is a model which integrates the CNN model and the LSTM model together in one architecture. In some embodiments, the ConvLSTM model is like an LSTM layer, but the input transformations and recurrent transformations are both convolutional. In some embodiments, the ConvLSTM model is represented by the following mathematical representations and equations:

$$I_t = \sigma(W_{xi}*X_t + W_{hi}*H_{t-1} + W_{ci} \circ C_{t-1} + b_i) \quad (7)$$

$$F_t = \sigma(W_{xf}*X_t + W_{hf}*H_{t-1} + W_{cf} \circ C_{t-1} + b_f) \quad (8)$$

$$C_t = F_t \circ C_{t-1} + I_t \circ \tanh(W_{xc}*X_t + W_{hc}*H_{t-1} + b_c) \quad (9)$$

$$O_t = \sigma(W_{xo}*X_t + W_{ho}*H_{t-1} + W_{co} \circ C_t + b_o) \quad (10)$$

$$H_t = O_t \circ \tanh C_t \quad (11)$$

Where:
* is a convolutional operator;
$X_t$: input tensors, it has the shape of (height, width, depth);
$I_t$: input gate tensors, it has the shape of (height, width, depth);
$F_t$: forget gate tensors, it has the shape (height, width, depth);
$C_t$: memory cell state tensors, it has the shape of (height, width, depth); and
$O_t$: output state tensors, it has the shape of (height, width, depth).

Figure 10:
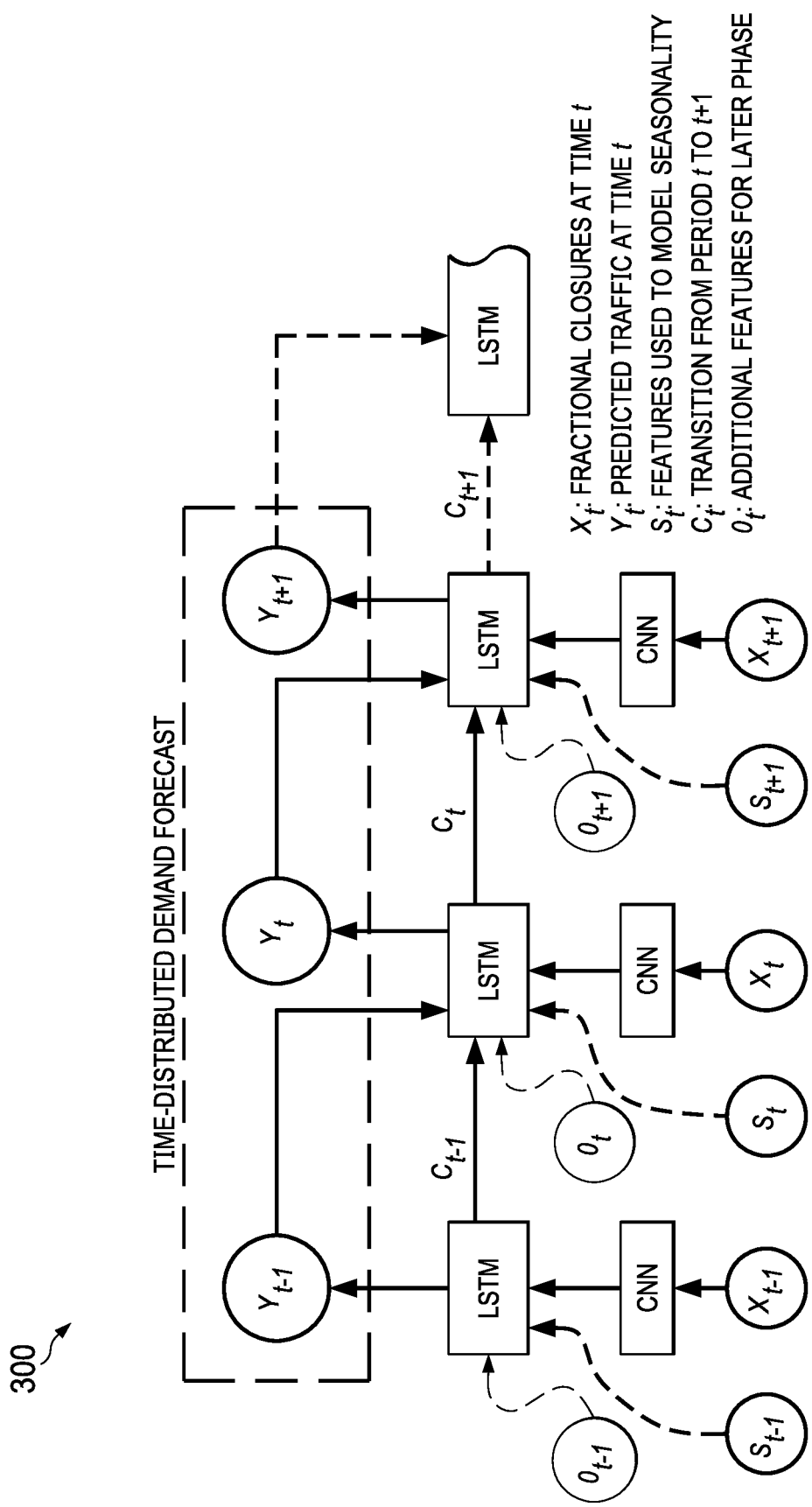
FIG. 10 provides a graphical representation of a forecasting model of the system of the FIG. 1, according to an example embodiment.

FIG. 10 provides a graphical representation 300 of one example embodiment of the forecasting model 20 that includes the ConvLSTM model that integrates the CNN model and the LSTM model together in one end-to-end deep learning architecture. In the embodiment illustrated, the forecasting model 20 has a sequential stack structure. In one embodiment, the CNN model represented by the boxes labeled "CNN" in FIG. 10 is implemented using the ConvLSTM2D function in the Python Keras library. The input data for the CNN model is a 5D tensor with shape: (samples, time, channels, rows, columns ("cols")), where sample is historical sample size; time is the length of each sample (timesteps); the channel is set to 1 (because the input data has a vector); and rows and cols are defined based on the input data structure. A convolutional feature extractor is applied on the input data, which is historical fractional closures (X_t) for all different fare products. The LSTM layer is put on top of the CNN's outputs and seasonality features (S_t). The LSTM model is represented by the boxes labeled "LSTM" and takes output from ConvLSTM2D and seasonality features as input. The input of the LSTM model is a 3D tensor with shape (samples, timestep, features). The output of the LSTM model is a 2D sensor with shape (sample, dimensions), with dimensions being the length of output vector. The outputs of the ConvLSTM model are the predicted traffic (Y_t), which is the bookings with the consideration of cancellation probabilities. For any forecasted flights, all different fractional closure scenarios are simulated, and the model is scored to get the demand forecast. In some embodiments, the model is scored based on an observation of bookings and class opening over time, with an estimation of booking demand for classes as if the classes were never closed. That is, and in some embodiments, all different fractional closures scenarios are simulated to score the model to account for unconstrained demand. For example, if historical data indicates that a class for a specific forecast key is available 40% of the time, then expected unconstrained bookings (i.e., bookings that would occur if the class never closed) can be calculated.

During the step 205, the forecasting model 20 uses historical dates to forecast demand for flights already booked. That is, in one embodiment, the forecasting model 20 is used in the step 205 to calculate a demand forecast $\hat{Y}$ at the key level.

Figure 11:
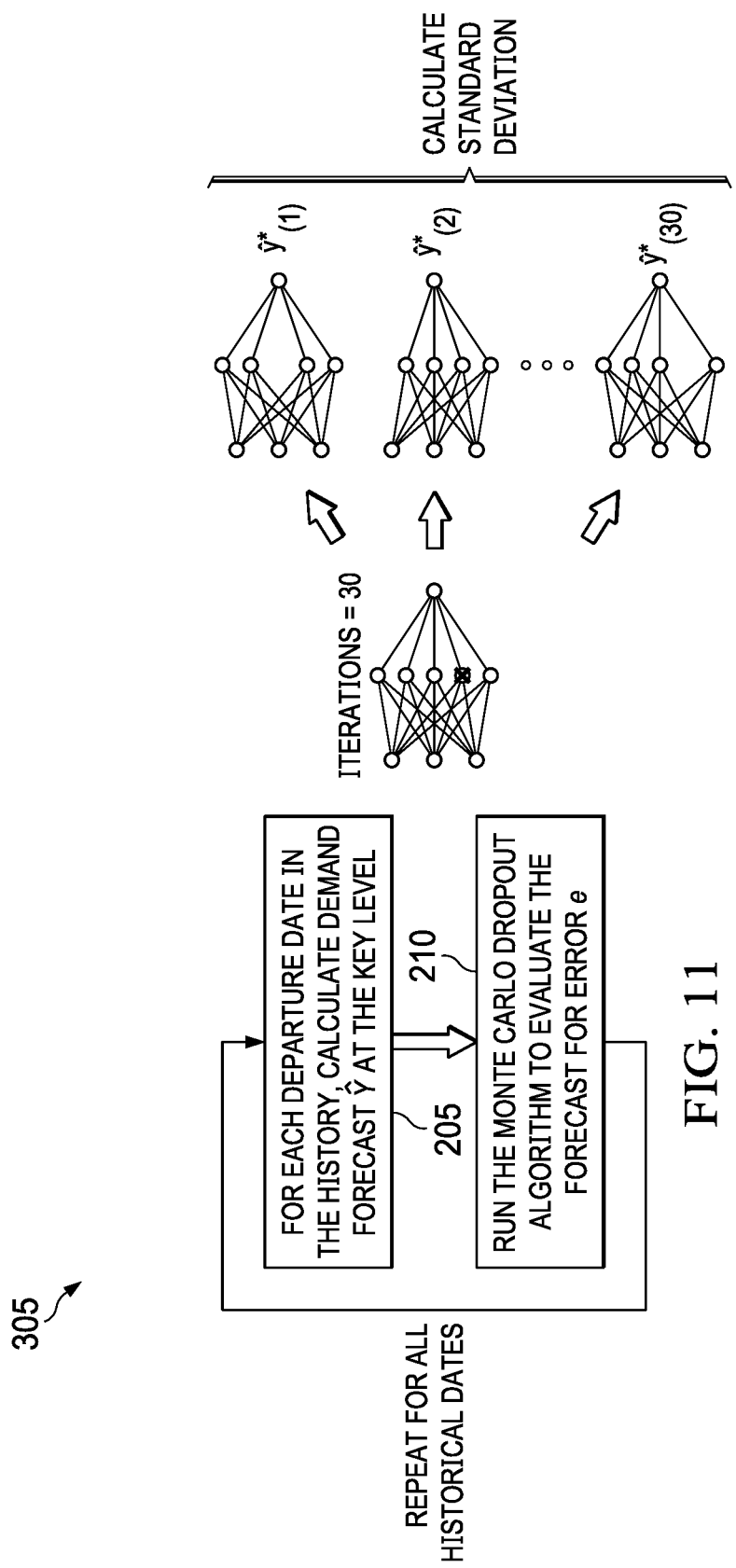
FIG. 11 illustrates a flow chart illustration and a graphical representation associated with the system of FIG. 1, according to an example embodiment.

Returning to FIG. 6 and at the step 210, the system 10 applies the Monte Carlo simulation-based dropout model 25 to the historical passenger demand forecasts to create a training sample. FIG. 11 illustrates a combination of a flow chart illustration and a graphical representation that are together referenced by the numeral 305. The flow chart illustration includes the step 205 and the step 210. At the step 205, for each departure date in the historical set of dates, the demand forecast $\hat{Y}$ at the key level is calculated. At the step 210, the Monte Carlo dropout algorithm is run to evaluate the forecast error e for the demand forecast $\hat{Y}$. The MC drop out model is applied to generate demand forecast distribution, hence standard deviation of demand forecast can be estimated. The steps 205 and 210 are repeated or all historical dates.

Returning to FIG. 6 and at the step 215, the system 10 trains or fits the neural network 30 using the historical demand forecast $\hat{Y}$ and the training sample that includes the forecast errors e to create a trained neural network 45 that approximates forecasting errors associated with the forecasting model 20. In some embodiments, each of the neural network 30 and the trained neural network 45 is an error prediction model that is a feedforward neural network model with 2 hidden layers of 32 and 16 hidden units. In some embodiments, the activation function used in the hidden layers is ReLU and LeakyReLU is used for the model output layer. The trained neural network 45 approximates the forecast $\hat{e}=f(X,\hat{Y})$.

In some embodiments and at the step 220, the system 10 calculates, using the forecasting model 20, a future demand forecast for each key level in the set of key levels and for each departure date in a second set of departure dates. In some embodiments, the step 220 is identical or substantially similar to the step 205 except that the step 205 is forecasting historical flights whereas the step 215 forecasts future flights.

Figure 12:
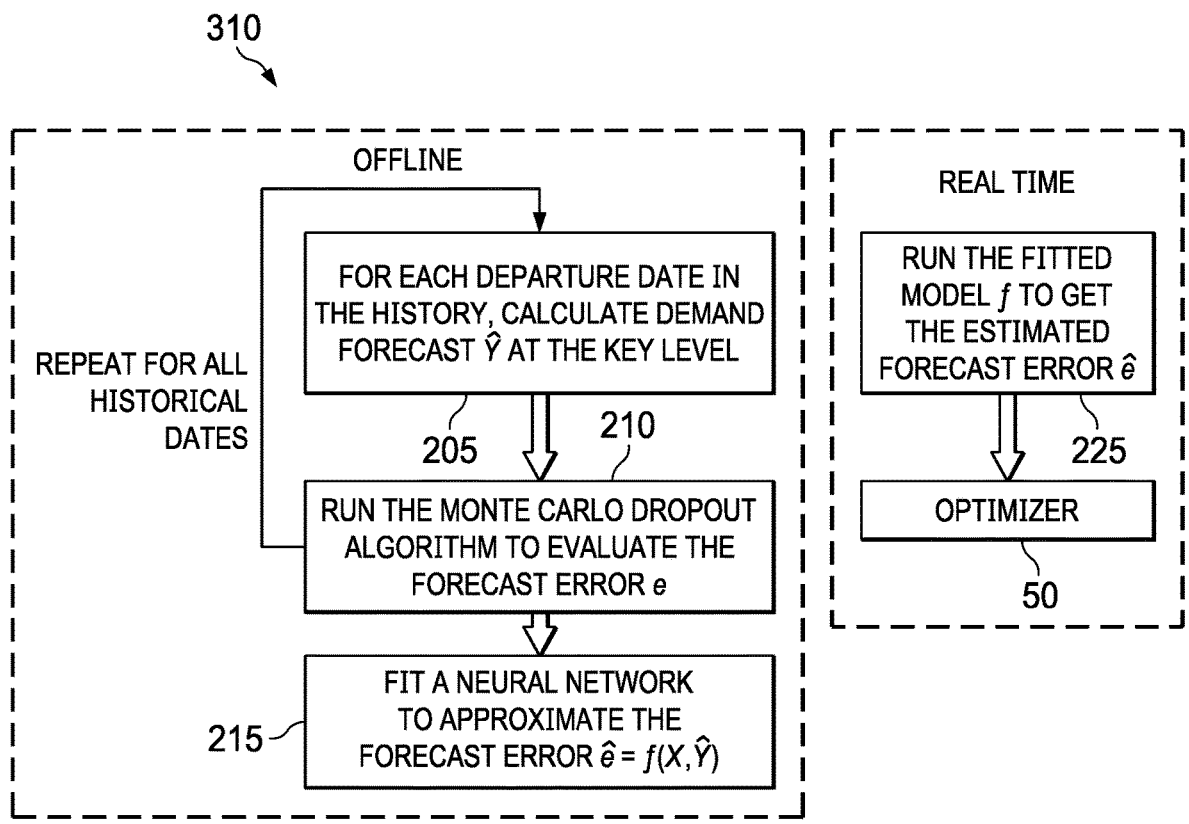
FIG. 12 illustrates a flow chart illustration associated with the system of FIG. 1, according to an example embodiment.

In some embodiments and at the step 225, the system 10 approximates, using the trained neural network 45, the forecasting error associated with the future demand forecasts for the second set of departure dates. FIG. 12 illustrates a flow chart illustration 310 that includes the steps 205, 210, 215m and 225. The system 10 runs the trained neural network 45 or fitted model f to get the estimated forecast error $\hat{e}$. The estimated forecast error $\hat{e}$ and the future demand forecast are inputs to the optimizer 50. In some embodiments, the estimated forecast error $\hat{e}$ and the future demand forecast are, together, a revised future passenger demand forecast. As illustrated, the steps 205, 210, and 215 occur offline or not in real time. Because it is very computationally expensive to solve large scale forecast problems where error prediction needs to be provided in near real time, the steps 205, 210, and 215 occur offline or not in real time. The step 225 is run in real time. Using the trained neural network 45 significantly reduces the time required to measure the prediction uncertainty for large scale demand forecast problems, therefore allows the step 225 to be run in real time.

In some embodiments, the step 205, 210, 215 may be repeated every three months using newer historical data to update the trained neural network 45 or fitted model f to estimate an updated forecast error $\hat{e}$, which can be used in real time processing or demand forecasting.

In some embodiments, the system 10 uses the forecast output, which is forecast error $\hat{e}$ and the future demand forecast to optimize the optimize inventory and price availability for each key level.

The system 10 results in multiple improvements to one or more of the technical fields of: demand forecasting, deep learning architecture, and modeling. For example, one improvement is the ability of the system 10 to capture booking dependences between different fare products, temporal dependences, and seasonality to solve a complex passenger demand forecasting problem. Another improvement is improved error calculation of the system 10. For example, the mean square error, which is the average squared difference between the predictions and the actual traffic, was used as an error metric to evaluate the performance between the system 10 and a conventional system. The MSE average for local traffic of the system 10 was 2.393 whereas the MSE average for local traffic of the conventional system was 2.574, which is associated with the system 10 resulting in a 7% improvement. The MSE average for flow traffic of the system 10 was 2.431 whereas the MSE average for flow traffic of the conventional system was 2.765, which is associated with the system 10 resulting in a 12% improvement. Using the trained neural network model 45 to approximate the forecast error enables the system 10 to solve large-scale forecast problems in a timely manner. For example, using the system 10, the time needed for online or real time scoring of the demand simulator and error demand simulator for one forecast key is 20 seconds (using one machine Intel® Xeon® Platinum 8160 CPU @ 2.10 GHz 24 cores). At the system level and using the system 10, the time needed is 380,000 seconds (using one machine Intel® Xeon® Platinum 8160 CPU @ 2.10 GHz 24 cores). In comparison, using conventional technology and methods, the time for online scoring of demand simulator and MC error demand simulator for one forecast key is 380 seconds (using one machine Intel® Xeon® Platinum 8160 CPU @ 2.10 GHz 24 cores). At the system level, using conventional technology and methods, the time needed is 7,220,000 seconds (using one machine Intel® Xeon® Platinum 8160 CPU @ 2.10 GHz 24 cores). Thus, the system 10 described above reduces the processing load and time on the computer upon which the method 600 is implemented.

Using the trained neural network model 45 to approximate the forecast error is not limited to use with the disclosed system and can be applied to any neural network system. Another improvement is that the system 10 can be easily extended to include new features, such as pricing, capacity, etc. to improve the model accuracy. Another improvement is that the system 10 replaces four different steps and ancillary processes that are illustrated in FIG. 4 with two steps that are illustrated in FIG. 5. Due to the reduction in steps and arrangement of the two steps of FIG. 5, the system 10 reduces error propagation and less segmentation leading to more accurate forecast (class and Day of Week ("DoW")).

Figure 13:
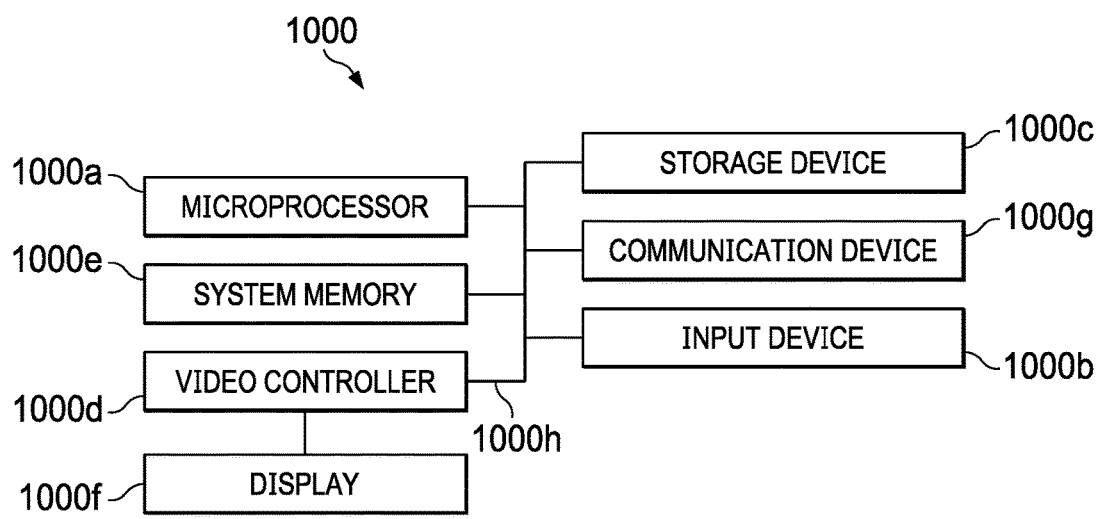
FIG. 13 is a diagrammatic illustration of a node for implementing one or more example embodiments of the present disclosure, according to an example embodiment.

In an example embodiment, as illustrated in FIG. 13 with continuing reference to FIGS. 1, 2, and 5-12, an illustrative node 1000 for implementing one or more of the example embodiments described above and/or illustrated in FIGS. 1, 2, and 5-12 is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several example embodiments, the storage device 1000*c* may include a floppy drive, hard drive, CD-ROM, optical drive, any other form of storage device and/or any combination thereof. In several example embodiments, the storage device 1000*c* may include, and/or be capable of receiving, a floppy disk, CD-ROM, DVD-ROM, or any other form of non-transitory computer-readable medium that may contain executable instructions. In several example embodiments, the communication device 1000*g* may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1, 2, and 5-12 include at least the node 1000 and/or components thereof, and/or one or more nodes that are substantially similar to the node 1000 and/or components thereof. In several example embodiments, one or more of the above-described components of the node 1000, the system, and/or the example embodiments described above and/or illustrated in FIGS. 1, 2, and 5-12 include respective pluralities of same components.

In several example embodiments, one or more of the applications, systems, and application programs described above and/or illustrated in FIGS. 1, 2, and 5-12 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure provides a method of training a neural network to approximate a forecasting error of a passenger-demand forecasting model, the method comprising: calculating, using the forecasting model, a historical passenger demand forecast for each key level in a set of key levels and for each departure date in a first set of departure dates; wherein each key level in the set of key levels is associated with a unique product for which demand is being forecasted; and wherein the first set of departures dates are historical departures dates; and applying a dropout model to the historical passenger demand forecasts to create a training sample; training, using the historical passenger demand forecasts and the training sample, the neural network, to approximate forecasting errors associated with the forecasting model; calculating, using the forecasting model, a future passenger demand forecast for each key level in the set of key levels and for each departure date in a second set of departure dates; wherein the second set of departures dates are future dates; and approximating, using the trained neural network, the forecasting error associated with the future passenger demand forecasts for the second set of departure dates. In one embodiment, the dropout model is a Monte Carlo simulation-based dropout model. In one embodiment, the method also includes calculating, using the future passenger demand forecasts and the forecasting error associated with the future passenger demand forecasts, a revised future passenger demand forecast for each key level in the set of key levels and for each departure date in the second set of departure dates. In one embodiment, applying the dropout model occurs offline; training the neural network occurs offline; calculating the future passenger demand forecasts for the second set of departures dates occurs in real time; and approximating the forecasting error associated with the future passenger demand forecasts for the second set of departure dates occurs in real time. In one embodiment, the unique product associated with each key level is defined by: a direction market that indicates a departure location from which a passenger departs and an arrival location at which the passenger arrives; a day of the week on which the passenger departs from the departure location; a block of time during the day in which the passenger departs from the departure location; a class category reflecting a fare paid by the passenger; and a forecast period reflecting a period of time before departure at which the fare was paid. In one embodiment, the forecasting model is an integrated model that comprises: a convolutional neural network ("CNN") model; a long short-term memory ("LSTM") model; and a convolutional LSTM model that integrates the CNN model and the LSTM model together in one architecture. In one embodiment, each departure date of the second set of departure dates is associated with a plurality of forecast periods; wherein each forecast period of the plurality of forecast periods is associated with a period of time before departure; wherein each departure date of the second set of departure dates is associated with a plurality of fare products; wherein each fare product of the plurality of fare products is a marketable combination of access rights associated with a charging moment; and wherein the CNN model captures, for each departure date of the second set of departure dates and for each forecast period from the plurality of forecasts periods on a given departure date, a booking relationship between the plurality of fare products. In one embodiment, the LSTM model is a recurrent neural network; and wherein the LSTM model models a time series that is a temporal correlation, across the departure dates of the second set of departure dates, of the booking relationships. In one embodiment, the method also includes calculating, using the forecasting model, the future passenger demand forecast for each key level in the set of key levels and for each departure date in the second set of departure dates comprises: applying a convolutional feature extractor on input data of the CNN model; wherein the input data comprises historical fractional closures for each fare product of the plurality of fare products; running the CNN model using the input data of the CNN model to create output(s) of the CNN model; and running the LSTM model using input data of the LSTM model to create LSTM model output(s); wherein input data of the LSTM model comprises: the output(s) of the CNN model; and features used to model seasonality; and wherein the output(s) of the LSTM model comprise predicted bookings with consideration of cancellation probabilities. In one embodiment, features used to model seasonality comprise features used to model effects of different days of the week, different weeks of a year, and holidays/non-holidays. In one embodiment, calculating, using the forecasting model, the future passenger demand forecast for each key level in the set of key levels and for each departure date in the second set of departure dates comprises: applying a convolutional feature extractor on input data of the CNN model; wherein the input data is a 5D tensor with shape (samples, time, channels, rows, cols); wherein a sample comprises historical sample size; and wherein time is a length of each sample; running the CNN model using the input data of the CNN model to create output(s) of the CNN model; running the LSTM model using input data of the LSTM model to create LSTM model output(s); wherein the input data for the LSTM model comprises: the output(s) of the CNN model; a 3D tensor with shape (samples, timestep, features); wherein the output(s) of the LSTM model comprise a 2D tensor with shape (sample, dimensions); and wherein dimensions are lengths of an output vector.

The present disclosure also provides a system for training a neural network to approximate a forecasting error of a passenger-demand forecasting model, the system comprising a non-transitory computer readable medium having stored thereon a plurality of instructions, wherein the instructions are executed with one or more processors so that the following steps are executed: calculating, using the forecasting model, a historical passenger demand forecast for each key level in a set of key levels and for each departure date in a first set of departure dates; wherein each key level in the set of key levels is associated with a unique product for which demand is being forecasted; and wherein the first set of departures dates are historical departures dates; and applying a dropout model to the historical passenger demand forecasts to create a training sample; training, using the historical passenger demand forecasts and the training sample, the neural network, to approximate forecasting errors associated with the forecasting model; calculating, using the forecasting model, a future passenger demand forecast for each key level in the set of key levels and for each departure date in a second set of departure dates; wherein the second set of departures dates are future dates; and approximating, using the trained neural network, the forecasting error associated with the future passenger demand forecasts for the second set of departure dates. In one embodiment, the dropout model is a Monte Carlo simulation-based dropout model. In one embodiment, the instructions are executed with the one or more processors so that the following step is also executed: calculating, using the future passenger demand forecasts and the forecasting error associated with the future passenger demand forecasts, a revised future passenger demand forecast for each key level in the set of key levels and for each departure date in the second set of departure dates. In one embodiment, applying the dropout model occurs offline; training the neural network occurs offline; calculating the future passenger demand forecasts for the second set of departures dates occurs in real time; and approximating the forecasting error associated with the future passenger demand forecasts for the second set of departure dates occurs in real time. In one embodiment, the unique product associated with each key level is defined by: a direction market that indicates a departure location from which a passenger departs and an arrival location at which the passenger arrives; a day of the week on which the passenger departs from the departure location; a block of time during the day in which the passenger departs from the departure location; a class category reflecting a fare paid by the passenger; and a forecast period reflecting a period of time before departure at which the fare was paid. In one embodiment, the forecasting model is an integrated model that comprises: a convolutional neural network ("CNN") model; a long short-term memory ("LSTM") model; and a convolutional LSTM model that integrates the CNN model and the LSTM model together in one architecture. In one embodiment, each departure date of the second set of departure dates is associated with a plurality of forecast periods; wherein each forecast period of the plurality of forecast periods is associated with a period of time before departure; wherein each departure date of the second set of departure dates is associated with a plurality of fare products; wherein each fare product of the plurality of fare products is a marketable combination of access rights associated with a charging moment; and wherein the CNN model captures, for each departure date of the second set of departure dates and for each forecast period from the plurality of forecasts periods on a given departure date, a booking relationship between the plurality of fare products.

In one embodiment, the LSTM model is a recurrent neural network; and wherein the LSTM model models a time series that is a temporal correlation, across the departure dates of the second set of departure dates, of the booking relationships. In one embodiment, calculating, using the forecasting model, the future passenger demand forecast for each key level in the set of key levels and for each departure date in the second set of departure dates comprises: applying a convolutional feature extractor on input data of the CNN model; wherein the input data comprises historical fractional closures for each fare product of the plurality of fare products; running the CNN model using the input data of the CNN model to create output(s) of the CNN model; and running the LSTM model using input data of the LSTM model to create LSTM model output(s); wherein input data of the LSTM model comprises: the output(s) of the CNN model; and features used to model seasonality; and wherein the output(s) of the LSTM model comprise predicted bookings with consideration of cancellation probabilities. In one embodiment, features used to model seasonality comprise features used to model effects of different days of the week, different weeks of a year, and holidays/non-holidays. In one embodiment, calculating, using the forecasting model, the future passenger demand forecast for each key level in the set of key levels and for each departure date in the second set of departure dates comprises: applying a convolutional feature extractor on input data of the CNN model; wherein the input data is a 5D tensor with shape (samples, time, channels, rows, cols); wherein a sample comprises historical sample size; and wherein time is a length of each sample; running the CNN model using the input data of the CNN model to create output(s) of the CNN model; running the LSTM model using input data of the LSTM model to create LSTM model output(s); wherein the input data for the LSTM model comprises: the output(s) of the CNN model; a 3D tensor with shape (samples, timestep, features); wherein the output(s) of the LSTM model comprise a 2D tensor with shape (sample, dimensions); and wherein dimensions are lengths of an output vector.

It is understood that variations may be made in the foregoing without departing from the scope of the disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries such as theater industries, and other industries; in several example embodiments, passengers of such various industries may be customers of such various industries, i.e., guests, attendees, passengers, consumers, etc. of such various industries; in several example embodiments, departure dates in such various industries may include performance dates, hotel check-in dates, travel departure dates, attendance dates, etc. In an example embodiment, aspects of the present disclosure are readily applicable and/or readily adaptable to a shipping transaction before, during or after which a ship travels from one port to another port and, in some case, on to one or more other ports. In an example embodiment, aspects of the present disclosure are readily applicable and/or readily adaptable to a trucking transaction before, during or after which a truck travels from one location to another location and, in some case, on to one or more other locations. In an example embodiment, aspects of the present disclosure are readily applicable and/or readily adaptable to a rail transaction before, during or after which a train travels from one city or station to another city or station and, in some cases, on to one or more other cities or stations. In an example embodiment, aspects of the present disclosure are applicable and/or readily adaptable to a wide variety of transportation transactions such as, for example, an airline sequence, a leg of an airline sequence, an airline block, and/or any combination thereof.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, or combined, at least in part, with one or more of the other elements and teachings of the various illustrative example embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, one or more of the example embodiments disclosed above and in one or more of FIGS. 1, 2, and 5-12 may be combined in whole or in part with any one or more of the other example embodiments described above and in one or more of FIGS. 1, 2, and 5-12.

Although several example embodiments have been disclosed in detail above and in one or more of FIGS. 1, 2, and 5-12, the embodiments disclosed are example only and are not limiting, and those skilled in the art will readily appreciate that many other modifications, changes, and substitutions are possible in the example embodiments without materially departing from the novel teachings and advantages of the present disclosure. Accordingly, all such modifications, changes, and substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of training a neural network to approximate a forecasting error of a passenger-demand forecasting model, the method comprising:
  calculating, using the forecasting model, a historical passenger demand forecast for each key level in a set of key levels and for each departure date in a first set of departure dates;
    wherein the forecasting model is an integrated model that comprises:
      a convolutional neural network ("CNN") model;
      a long short-term memory ("LSTM") model;
        wherein the LSTM model is a recurrent neural network;
      and
      a convolutional LSTM model that integrates the CNN model and the LSTM model together in one architecture;
    wherein each key level in the set of key levels is associated with a unique product for which demand is being forecasted; and
    wherein the first set of departures dates are historical departures dates;
  applying a dropout model to the historical passenger demand forecasts to create a training sample;
  training, using the historical passenger demand forecasts and the training sample, the neural network, to approximate forecasting errors associated with the forecasting model;
  calculating, using the forecasting model, a future passenger demand forecast for each key level in the set of key levels and for each departure date in a second set of departure dates;
    wherein the second set of departures dates are future dates;
    wherein each departure date of the second set of departure dates is associated with a plurality of forecast periods;
    wherein each forecast period of the plurality of forecast periods is associated with a period of time before departure;
    wherein each departure date of the second set of departure dates is associated with a plurality of fare products;
    wherein each fare product of the plurality of fare products is a marketable combination of access rights associated with a charging moment;
    wherein the CNN model captures, for each departure date of the second set of departure dates and for each forecast period from the plurality of forecasts periods on a given departure date, a booking relationship between the plurality of fare products;
    wherein the LSTM model models a time series that is a temporal correlation, across the departure dates of the second set of departure dates, of the booking relationships; and
    wherein calculating, using the forecasting model, the future passenger demand forecast for each key level in the set of key levels and for each departure date in the second set of departure dates comprises:
      applying a convolutional feature extractor on input data of the CNN model;
        wherein the input data comprises historical fractional closures for each fare product of the plurality of fare products;
      running the CNN model using the input data of the CNN model to create output(s) of the CNN model; and
      running the LSTM model using input data of the LSTM model to create LSTM model output(s);
        wherein input data of the LSTM model comprises:
          the output(s) of the CNN model; and
          features used to model seasonality; and
        wherein the output(s) of the LSTM model comprise predicted bookings with consideration of cancellation probabilities;
  and
  approximating, using the trained neural network, the forecasting error associated with the future passenger demand forecasts for the second set of departure dates.

2. The method of claim 1, further comprising calculating, using the future passenger demand forecasts and the forecasting error associated with the future passenger demand forecasts, a revised future passenger demand forecast for each key level in the set of key levels and for each departure date in the second set of departure dates.

3. The method of claim 1,
wherein applying the dropout model occurs offline;
wherein training the neural network occurs offline;
wherein calculating the future passenger demand forecasts for the second set of departures dates occurs in real time; and
wherein approximating the forecasting error associated with the future passenger demand forecasts for the second set of departure dates occurs in real time.

4. The method of claim 1, wherein the unique product associated with each key level is defined by:
- a direction market that indicates a departure location from which a passenger departs and an arrival location at which the passenger arrives;
- a day of the week on which the passenger departs from the departure location;
- a block of time during the day in which the passenger departs from the departure location;
- a class category reflecting a fare paid by the passenger; and
- a forecast period reflecting a period of time before departure at which the fare was paid.

5. The method of claim 1, wherein features used to model seasonality comprise features used to model effects of different days of the week, different weeks of a year, and holidays/non-holidays.

6. A method of training a neural network to approximate a forecasting error of a passenger-demand forecasting model, the method comprising:
- calculating, using the forecasting model, a historical passenger demand forecast for each key level in a set of key levels and for each departure date in a first set of departure dates;
  - wherein the forecasting model is an integrated model that comprises:
    - a convolutional neural network ("CNN") model;
    - a long short-term memory ("LSTM") model;
      - wherein the LSTM model is a recurrent neural network; and
    - a convolutional LSTM model that integrates the CNN model and the LSTM model together in one architecture;
  - wherein each key level in the set of key levels is associated with a unique product for which demand is being forecasted; and
  - wherein the first set of departures dates are historical departures dates;
- applying a dropout model to the historical passenger demand forecasts to create a training sample;
- training, using the historical passenger demand forecasts and the training sample, the neural network, to approximate forecasting errors associated with the forecasting model;
- calculating, using the forecasting model, a future passenger demand forecast for each key level in the set of key levels and for each departure date in a second set of departure dates;
  - wherein the second set of departures dates are future dates;
  - wherein each departure date of the second set of departure dates is associated with a plurality of forecast periods;
  - wherein each forecast period of the plurality of forecast periods is associated with a period of time before departure;
  - wherein each departure date of the second set of departure dates is associated with a plurality of fare products;
  - wherein each fare product of the plurality of fare products is a marketable combination of access rights associated with a charging moment;
  - wherein the CNN model captures, for each departure date of the second set of departure dates and for each forecast period from the plurality of forecasts periods on a given departure date, a booking relationship between the plurality of fare products;
  - wherein the LSTM model models a time series that is a temporal correlation, across the departure dates of the second set of departure dates, of the booking relationships; and
  - wherein calculating, using the forecasting model, the future passenger demand forecast for each key level in the set of key levels and for each departure date in the second set of departure dates comprises:
    - applying a convolutional feature extractor on input data of the CNN model;
      - wherein the input data is a 5D tensor with shape (samples, time, channels, rows, cols);
      - wherein a sample comprises historical sample size; and
      - wherein time is a length of each sample;
    - running the CNN model using the input data of the CNN model to create output(s) of the CNN model; and
    - running the LSTM model using input data of the LSTM model to create LSTM model output(s);
      - wherein the input data for the LSTM model comprises:
        - the output(s) of the CNN model;
        - a 3D tensor with shape (samples, timestep, features);
      - wherein the output(s) of the LSTM model comprise a 2D tensor with shape (sample, dimensions); and
      - wherein dimensions are lengths of an output vector; and
- approximating, using the trained neural network, the forecasting error associated with the future passenger demand forecasts for the second set of departure dates.

7. The method of claim 6, further comprising calculating, using the future passenger demand forecasts and the forecasting error associated with the future passenger demand forecasts, a revised future passenger demand forecast for each key level in the set of key levels and for each departure date in the second set of departure dates.

8. The method of claim 6,
wherein applying the dropout model occurs offline;
wherein training the neural network occurs offline;
wherein calculating the future passenger demand forecasts for the second set of departures dates occurs in real time; and
wherein approximating the forecasting error associated with the future passenger demand forecasts for the second set of departure dates occurs in real time.

9. The method of claim 6, wherein the unique product associated with each key level is defined by:
- a direction market that indicates a departure location from which a passenger departs and an arrival location at which the passenger arrives;
- a day of the week on which the passenger departs from the departure location;

a block of time during the day in which the passenger departs from the departure location;
a class category reflecting a fare paid by the passenger; and
a forecast period reflecting a period of time before departure at which the fare was paid.

10. The method of claim 6, wherein features used to model seasonality comprise features used to model effects of different days of the week, different weeks of a year, and holidays/non-holidays.

11. A system for training a neural network to approximate a forecasting error of a passenger-demand forecasting model, the system comprising a non-transitory computer readable medium having stored thereon a plurality of instructions, wherein the instructions are executed with one or more processors so that the following steps are executed:
calculating, using the forecasting model, a historical passenger demand forecast for each key level in a set of key levels and for each departure date in a first set of departure dates;
wherein the forecasting model is an integrated model that comprises:
a convolutional neural network ("CNN") model;
a long short-term memory ("LSTM") model;
wherein the LSTM model is a recurrent neural network;
and
a convolutional LSTM model that integrates the CNN model and the LSTM model together in one architecture
wherein each key level in the set of key levels is associated with a unique product for which demand is being forecasted; and
wherein the first set of departures dates are historical departures dates; and
applying a dropout model to the historical passenger demand forecasts to create a training sample;
training, using the historical passenger demand forecasts and the training sample, the neural network, to approximate forecasting errors associated with the forecasting model;
calculating, using the forecasting model, a future passenger demand forecast for each key level in the set of key levels and for each departure date in a second set of departure dates;
wherein the second set of departures dates are future dates;
wherein each departure date of the second set of departure dates is associated with a plurality of forecast periods;
wherein each forecast period of the plurality of forecast periods is associated with a period of time before departure;
wherein each departure date of the second set of departure dates is associated with a plurality of fare products;
wherein each fare product of the plurality of fare products is a marketable combination of access rights associated with a charging moment;
wherein the CNN model captures, for each departure date of the second set of departure dates and for each forecast period from the plurality of forecasts periods on a given departure date, a booking relationship between the plurality of fare products;
wherein the LSTM model models a time series that is a temporal correlation, across the departure dates of the second set of departure dates, of the booking relationships;
wherein calculating, using the forecasting model, the future passenger demand forecast for each key level in the set of key levels and for each departure date in the second set of departure dates comprises:
applying a convolutional feature extractor on input data of the CNN model;
wherein the input data comprises historical fractional closures for each fare product of the plurality of fare products;
running the CNN model using the input data of the CNN model to create output(s) of the CNN model; and
running the LSTM model using input data of the LSTM model to create LSTM model output(s);
wherein input data of the LSTM model comprises:
the output(s) of the CNN model; and
features used to model seasonality; and
wherein the output(s) of the LSTM model comprise predicted bookings with consideration of cancellation probabilities;
and
approximating, using the trained neural network, the forecasting error associated with the future passenger demand forecasts for the second set of departure dates.

12. The system of claim 11, wherein the instructions are executed with the one or more processors so that the following step is also executed:
calculating, using the future passenger demand forecasts and the forecasting error associated with the future passenger demand forecasts, a revised future passenger demand forecast for each key level in the set of key levels and for each departure date in the second set of departure dates.

13. The system of claim 11,
wherein applying the dropout model occurs offline;
wherein training the neural network occurs offline;
wherein calculating the future passenger demand forecasts for the second set of departures dates occurs in real time; and
wherein approximating the forecasting error associated with the future passenger demand forecasts for the second set of departure dates occurs in real time.

14. The system of claim 11, wherein the unique product associated with each key level is defined by:
a direction market that indicates a departure location from which a passenger departs and an arrival location at which the passenger arrives;
a day of the week on which the passenger departs from the departure location;
a block of time during the day in which the passenger departs from the departure location;
a class category reflecting a fare paid by the passenger; and
a forecast period reflecting a period of time before departure at which the fare was paid.

15. The system of claim 11, wherein features used to model seasonality comprise features used to model effects of different days of the week, different weeks of a year, and holidays/non-holidays.

16. A system for training a neural network to approximate a forecasting error of a passenger-demand forecasting model, the system comprising a non-transitory computer readable medium having stored thereon a plurality of instructions, wherein the instructions are executed with one or more processors so that the following steps are executed:

calculating, using the forecasting model, a historical passenger demand forecast for each key level in a set of key levels and for each departure date in a first set of departure dates;
wherein the forecasting model is an integrated model that comprises:
a convolutional neural network ("CNN") model;
a long short-term memory ("LSTM") model;
wherein the LSTM model is a recurrent neural network;
and
a convolutional LSTM model that integrates the CNN model and the LSTM model together in one architecture
wherein each key level in the set of key levels is associated with a unique product for which demand is being forecasted; and
wherein the first set of departures dates are historical departures dates; and
applying a dropout model to the historical passenger demand forecasts to create a training sample;
training, using the historical passenger demand forecasts and the training sample, the neural network, to approximate forecasting errors associated with the forecasting model;
calculating, using the forecasting model, a future passenger demand forecast for each key level in the set of key levels and for each departure date in a second set of departure dates;
wherein the second set of departures dates are future dates;
wherein each departure date of the second set of departure dates is associated with a plurality of forecast periods;
wherein each forecast period of the plurality of forecast periods is associated with a period of time before departure;
wherein each departure date of the second set of departure dates is associated with a plurality of fare products;
wherein each fare product of the plurality of fare products is a marketable combination of access rights associated with a charging moment;
wherein the CNN model captures, for each departure date of the second set of departure dates and for each forecast period from the plurality of forecasts periods on a given departure date, a booking relationship between the plurality of fare products;
wherein the LSTM model models a time series that is a temporal correlation, across the departure dates of the second set of departure dates, of the booking relationships;
and
wherein calculating, using the forecasting model, the future passenger demand forecast for each key level in the set of key levels and for each departure date in the second set of departure dates comprises:
applying a convolutional feature extractor on input data of the CNN model;
wherein the input data is a 5D tensor with shape (samples, time, channels, rows, cols);
wherein a sample comprises historical sample size; and
wherein time is a length of each sample;
running the CNN model using the input data of the CNN model to create output(s) of the CNN model;
running the LSTM model using input data of the LSTM model to create LSTM model output(s);
wherein the input data for the LSTM model comprises:
the output(s) of the CNN model;
a 3D tensor with shape (samples, timestep, features);
wherein the output(s) of the LSTM model comprise a 2D tensor with shape (sample, dimensions); and
wherein dimensions are lengths of an output vector;
and
approximating, using the trained neural network, the forecasting error associated with the future passenger demand forecasts for the second set of departure dates.

17. The system of claim 16, wherein the instructions are executed with the one or more processors so that the following step is also executed:
calculating, using the future passenger demand forecasts and the forecasting error associated with the future passenger demand forecasts, a revised future passenger demand forecast for each key level in the set of key levels and for each departure date in the second set of departure dates.

18. The system of claim 16, wherein applying the dropout model occurs offline;
wherein training the neural network occurs offline;
wherein calculating the future passenger demand forecasts for the second set of departures dates occurs in real time; and
wherein approximating the forecasting error associated with the future passenger demand forecasts for the second set of departure dates occurs in real time.

19. The system of claim 16, wherein the unique product associated with each key level is defined by:
a direction market that indicates a departure location from which a passenger departs and an arrival location at which the passenger arrives;
a day of the week on which the passenger departs from the departure location;
a block of time during the day in which the passenger departs from the departure location;
a class category reflecting a fare paid by the passenger; and
a forecast period reflecting a period of time before departure at which the fare was paid.

20. The system of claim 16, wherein features used to model seasonality comprise features used to model effects of different days of the week, different weeks of a year, and holidays/non-holidays.

* * * * *